United States Patent
Fischer et al.

(10) Patent No.: US 9,346,910 B2
(45) Date of Patent: May 24, 2016

(54) AQUEOUS EPOXY RESIN DISPERSIONS

(75) Inventors: Thomas Fischer, Graz (AT); Elfriede Prucher, Graz (AT)

(73) Assignee: Allnex Austria GmbH, Werndorf (AT)

( * ) Notice: Subject to any disclaimer, the term of this patent is extended or adjusted under 35 U.S.C. 154(b) by 949 days.

(21) Appl. No.: 13/510,987

(22) PCT Filed: Nov. 22, 2010

(86) PCT No.: PCT/EP2010/067960
§ 371 (c)(1),
(2), (4) Date: Aug. 21, 2012

(87) PCT Pub. No.: WO2011/064176
PCT Pub. Date: Jun. 3, 2011

(65) Prior Publication Data
US 2012/0308729 A1    Dec. 6, 2012

(30) Foreign Application Priority Data

Nov. 24, 2009  (EP) .................................... 09176892

(51) Int. Cl.
*C08G 59/18* (2006.01)
*C08G 59/14* (2006.01)
*C08L 63/00* (2006.01)
*C09D 163/00* (2006.01)

(52) U.S. Cl.
CPC .......... *C08G 59/182* (2013.01); *C08G 59/1438* (2013.01); *C08L 63/00* (2013.01); *C09D 163/00* (2013.01); *C08L 2201/54* (2013.01)

(58) Field of Classification Search
CPC .............................. C08L 63/00; C08G 59/182
USPC ........................................................ 427/358
See application file for complete search history.

(56) References Cited

U.S. PATENT DOCUMENTS

| | | | | |
|---|---|---|---|---|
| 3,425,976 A * | 2/1969 | Adams | ................... | C08K 5/103 264/564 |
| 3,447,940 A * | 6/1969 | Halleck | ................... | C09D 5/024 106/162.1 |
| 3,654,201 A * | 4/1972 | Mansour et al. | .......... | C08F 2/08 524/507 |
| 3,669,728 A * | 6/1972 | Seiner | .................. | C08J 9/28 427/157 |
| 3,806,478 A * | 4/1974 | Mansour et al. | ...... | C08F 251/02 524/733 |
| 4,886,845 A | 12/1989 | Becker et al. | | |
| 5,236,974 A | 8/1993 | Dreischhoff et al. | | |
| 5,925,694 A | 7/1999 | Stengel-Rutkowski et al. | | |
| 6,207,228 B1 * | 3/2001 | Hundt | ..................... | B27N 1/00 118/303 |
| 6,555,174 B2 * | 4/2003 | Yamaji | ..................... | C08J 3/245 427/381 |
| 7,462,658 B2 * | 12/2008 | Lammerschop | ..... | C08G 59/621 428/411.1 |
| 2003/0001135 A1 | 1/2003 | Gerlitz et al. | | |
| 2007/0088102 A1 | 4/2007 | Knouse | | |
| 2009/0149591 A1 * | 6/2009 | Yang | ..................... | C09D 5/024 524/418 |
| 2011/0098376 A1 * | 4/2011 | Sheerin | .................. | C08F 6/003 523/122 |
| 2012/0165428 A1 * | 6/2012 | Tilara | .................. | C09D 133/06 523/400 |

FOREIGN PATENT DOCUMENTS

| | | |
|---|---|---|
| CN | 101292004 A | 10/2008 |
| EP | 0272595 A2 | 6/1988 |
| EP | 0530602 A1 | 3/1993 |
| EP | 1266920 A2 | 12/2002 |
| JP | S63168425 A | 7/1988 |
| JP | 2004359746 A | 12/2004 |

OTHER PUBLICATIONS

International Search Report for PCT/EP2010/0067960 mailed Mar. 11, 2011.
International Written Opinion for PCT/EP2010/0067960 mailed Mar. 11, 2011.
International Preliminary Report on Patentability for PCT/EP2010/067960 dated May 30, 2012.

* cited by examiner

*Primary Examiner* — Megan McCulley
(74) *Attorney, Agent, or Firm* — Drinker Biddle & Reath LLP

(57) ABSTRACT

The invention relates to an aqueously dispersible epoxy resin E, comprising building blocks derived from an aliphatic polyether polyol A, an epoxy resin B having at least two epoxide groups per molecule, an epoxy resin B' having at least two epoxide groups per molecule, which may be identical to B, or different from B, an epoxy-functional fatty acid ester D, and an aromatic polyol C, a process for the preparation thereof, and a method of use thereof.

4 Claims, No Drawings

AQUEOUS EPOXY RESIN DISPERSIONS

CROSS-REFERENCE TO RELATED APPLICATIONS

This application is a national stage application (under 35 U.S.C. §371) of PCT/EP2010/067960, filed Nov. 22, 2010, which claims benefit of European Application 09176892.9, filed Nov. 24, 2009.

This invention relates to aqueous epoxy resin dispersions which are low in VOC, a process for the production thereof, and a method of use thereof in coating applications, particularly for metal and concrete coating.

Application of aqueous epoxy resin dispersions particularly in metal coating and corrosion protection has been known from, i. a., EP 1 266 920 B1.

While solvent based epoxy resins liberate a high amount of volatile solvents upon curing, even the commonly used water-based epoxy resin coating compositions are not free from volatile components as such compounds are usually used as coalescent agents to promote the formation of a continuous and comprehensive film. In most instances benzyl alcohol is used. This constituent is gradually lost upon ambient condition drying and crosslinking which is the common drying mechanism particularly in applications such as flooring or coating of large metal parts. This leads to retarded hardness buildup as the coalescent agent also acts as plasticiser. The slower hardness buildup also leads to a retarded buildup of water resistance of the coating film because the film still retains swellability by, and permeability for, water or humidity.

It is therefore an object of this invention to reduce the amount of volatile material evolved during drying and crosslinking of water-borne epoxy resin based coating compositions, leading to early hardness development without sacrificing the favourable film-forming properties of, and particularly, corrosion resistance imparted by, epoxy resin-based coatings.

Aqueously emulsified epoxy resins can advantageously be prepared according to EP 0 272 595 A2 where a self-emulsifying epoxy resin has a specific amount of substance of epoxy groups of from 0.1 mol/kg to 4 mol/kg (corresponding to the so-called "epoxy equivalent" of between 250 g/mol and 10,000 g/mol) and is a condensation product of (a) a mass fraction of from 50% to 80%, preferably 55% to 70%, based on the mass of the reaction mixture, of an epoxy compound containing at least two epoxide groups per molecule and having a specific amount of substance of epoxy groups of from 0.5 mol/kg to 10 mol/kg (corresponding to an epoxy equivalent of from 100 g/mol to 2,000 g/mol), a mass fraction of from 35% to 17%, preferably from 35% to 20% of an aromatic polyol, and a mass fraction of from 15% to 3%, preferably from 9% to 4% of a condensation product of an aliphatic polyol with a number average molar mass $M_w$ of from 200 g/mol to 20,000 g/mol and an epoxy compound containing at least two epoxy groups per molecule and having a specific amount of substance of epoxy groups of from 0.5 mol/kg to 10 mol/kg (corresponding to an "epoxy equivalent" of from 100 g/mol to 2,000 g/mol), the ratio of the number of OH groups in the aliphatic polyol to the number of epoxy groups of the epoxy compound used in the condensation reaction being from 1:0.85 to 1:3.5 and the specific amount of substance of epoxy groups of said condensation product being between less than 0.02 mol/kg and 5 mol/kg (corresponding to an "epoxy equivalent" between 200 g and at least 50,000 g/mol). Coating compositions formulated from the epoxy resins together with appropriate curing agents, and optionally, pigments, fillers, and additives, usually also comprise coalescing agents, benzyl alcohol usually being a preferred choice. As outlined supra, this constituent adds to the VOC of the coating compositions thus prepared.

It has been found in the investigations and experiments underlying the present invention that this coalescing agent can advantageously be replaced by a reactive fatty acid ester having epoxy groups, which is added to the reaction mixture as described supra, to prepare the aqueously dispersed epoxy resin.

The invention therefore relates to an aqueously dispersible epoxy resin E, comprising building blocks derived from an aliphatic polyether polyol A, an epoxy resin B having at least two epoxide groups per molecule, an epoxy resin B' having at least two epoxide groups per molecule, which may be identical to B, or different from B, an epoxy-functional fatty acid ester D, and an aromatic polyol C.

The invention also relates to a process of making the aqueously dispersible epoxy resin E, which process comprises reacting in the first step an aliphatic polyether polyol A and an epoxy resin B having at least two epoxide groups per molecule in the presence of an acidic catalyst wherein an adduct AB is formed. This adduct AB is then reacted in the second step in an advancement reaction with a further epoxy resin B', the epoxy functional fatty acid ester D, and an aromatic polyol C.

In a preferred embodiment, the aqueously dispersible epoxy resin E comprises building blocks derived from
- an aliphatic polyether polyol A, which is a polyoxyalkylene ether glycol comprising a mass fraction of at least 20% of oxyethylene groups, and preferably having a number average molar mass $M_n$ of from 0.2 kg/mol to 20 kg/mol,
- an epoxy resin B having at least two epoxide groups per molecule, which preferably has a polyether structure which in turn has moieties derived from 1,2,3-trihydroxypropane and moieties derived from aromatic dihydroxy compounds,
- an epoxy resin B' having at least two epoxide groups per molecule, which may be identical to B, or different from B, and which preferably has a polyether structure which in turn has moieties derived from 1,2,3-trihydroxypropane and moieties derived from aromatic dihydroxy compounds,
- an epoxy-functional fatty acid ester D, which is an ester of an at least monovalent aliphatic alcohol D1 having from one to ten carbon atoms, and a monofunctional fatty acid D2 having from six to thirty carbon atoms, wherein at least one of the alcohol and the fatty acid has an epoxy group in its molecule, and
- an aromatic polyol C which is an aromatic compound having from five to twenty carbon atoms and at least two hydroxyl groups.

The aliphatic polyether polyol A is preferably polyethylene glycol, having exclusively oxyethylene groups, or a copolymer which may be a random copolymer, or preferably, a block copolymer of oxyethylene and oxypropylene units, and has preferably at least two hydroxyl groups. Its number average molar mass $M_n$ is from 0.2 kg/mol to 20 kg/mol, preferably from 0.5 kg/mol to 12 kg/mol, and particularly preferred, from 1 kg/mol to 10 kg/mol. It is also preferred to use mixtures of such polyols, particularly of polyoxyethylene polyols, and particularly preferably mixtures of two such polyols.

The epoxy resin B has at least two epoxide groups per molecule, and has preferably a polyether structure which in turn has moieties derived from 1,2,3-trihydroxypropane and moieties derived from aromatic dihydroxy or polyhydroxy compounds B1. Generally, the polyepoxides have on average at least two epoxy groups per molecule. Said epoxy compounds may be aliphatic, cycloaliphatic, aromatic or heterocyclic and may also contain hydroxyl groups. They may furthermore contain substituents which, under the mixing or reaction conditions, cause no interfering side reactions, for example alkyl or aryl substituents, ether groupings and the like. Preferably, these epoxy compounds are polyglycidyl ethers based on polyhydric, preferably dihydric alcohols B2, polyhydric, preferably dihydric phenols B1, hydrogenation products of said phenols B1, and/or novolaks B3 (reaction products of mono- or dihydric phenols with aldehydes, in particular formaldehyde, in the presence of acidic catalysts). The specific amount of substance of epoxy groups of said epoxy compounds B are preferably from 2 mol/kg to 6 mol/kg, preferably from 4 mol/kg to 5.9 mol/kg ("epoxy equivalents" between 160 g/mol and 500 g/mol, in particular between 170 g/mol and 250 g/mol). As polyhydric phenols B1, mention may be made, for example, of: resorcinol, hydroquinone, 2,2-bis(4-hydroxyphenyl)-propane (bisphenol A), the isomeric mixtures of dihydroxydiphenylmethane (bis-phenol F), tetrabromobisphenol A, 4,4'-dihydroxydiphenylcyclohexane, 4,4'-di-hydroxy-3,3'-dimethyldiphenylpropane, 4,4'-dihydroxydiphenyl, 4,4'-dihydroxy-benzophenone, bis(4-hydroxyphenyl)-1,1-ethane, bis(4-hydroxyphenyl)-1,1-iso-butane, bis(4-hydroxy-tert-butylphenyl)-2,2-propane, bis(2-hydroxynaphthyl)-methane, 1,5-dihydroxynaphthalene, tris(4-hydroxyphenyl) methane, bis(4-hydroxyphenyl) ether, and bis(4-hydroxyphenyl)sulfone, and also the chlorination and bromination products of the abovementioned compounds. Bisphenol A is particularly preferred in this connection.

Polyglycidyl ethers of polyhydric alcohols B2 are also suitable as epoxy resins B. As examples of such polyhydric alcohols B2, mention may be made of ethylene glycol, diethylene glycol, triethylene glycol, 1,2-propylene glycol, polyoxypropylene glycols (with from two to ten 1,2-propyleneoxy units), 1,3-propylene glycol, 1,4-butylene glycol, 1,5-pentanediol, 1,6-hexanediol, 1,2,6-hexanetriol, glycerol, and bis(4-hydroxycyclohexyl)-2,2-propane.

It is also possible to use polyglycidyl esters of polycarboxylic acids B4 which are obtained by a reaction of epichlorohydrin or similar epoxy compounds which an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerised linolenic acid. Examples are diglycidyl adipate, diglycidyl phthalate and diglycidyl hexahydrophthalate.

A detailed enumeration of the suitable epoxy compounds B is to be found in the handbook entitled "Epoxidverbindungen and Epoxidharze [Epoxy Compounds and Epoxy Resins]" by A. M. Paquin, Springer Verlag, Berlin 1958, chapter IV, and in Lee and Neville "Handbook of Epoxy Resins", 1967, chapter 2.

Mixtures of several epoxy compounds B may also be used.

The epoxy compounds, or epoxy resins, B', may be selected from the same group of compounds as detailed supra, but need not be identical to these. Thus, it is possible to use an epoxy resin based on bisphenol A as component B, and an epoxy resin based on a glycidyl ether of polyoxypropylene glycol as epoxy resin B'.

The aromatic polyols C compounds containing OH groups are preferably selected from the group of compounds B1 as detailed supra, i.e. polyhydric, preferably dihydric, phenols, their chlorination or bromination products, and/or novolaks. Here, too, bisphenol A is also particularly preferred.

The epoxy functional fatty acid ester D is an ester of an at least monovalent aliphatic alcohol D1 having from one to ten carbon atoms, and a monofunctional fatty acid D2 having from six to thirty carbon atoms, wherein at least one of the alcohol and the fatty acid has an epoxy group in its molecule. Thus, it is possible to combine an epoxy functional alcohol Die with a fatty acid D2n having no epoxy functionality, or an epoxy functional fatty acid D2e with an alcohol Din having no epoxy functionality, and an epoxy functional alcohol Die with an epoxy functional fatty acid D2e. Examples for the first variant are glycidyl esters of fatty acids having from five to forty carbon atoms, such as glycidyl pentanoate, glycidyl 2-ethyl hexanoate, glycidyl stearate, and the glycidyl mono- and diesters of dimerised fatty acids, where esters of fatty acids having at least 8 carbon atoms have shown better effect as coalescing agents. Examples for the second variant are esters of epoxidised mono-unsaturated fatty acids, such as erucic acid, palmitoleic acid, oleic acid, with monohydric aliphatic alcohols having from 1 to 20 carbon atoms, preferably, dihydric aliphatic alcohols having from 2 to 20 carbon atoms, and particularly preferred, at least trihydric aliphatic alcohols having from at least three to twenty carbon atoms. In the case or dihydric alcohols having two hydroxyl groups, or polyhydric alcohols having at least three hydroxyl groups, at least one of the hydroxyl groups is esterified with an epoxy-functional fatty acid, and preferably, all hydroxyl groups are so esterified. A particularly preferred embodiment includes the use of an ester of glycerol with a mixture of epoxidised fatty acids derived from naturally occurring oils, such as epoxidised soy bean oil fatty acid, epoxidised tall oil fatty acid, or epoxidised linseed oil fatty acid. It is preferred to use an amount of epoxy functional fatty acid ester D corresponding to a mass fraction of from 0.5% to 20%, particularly preferred, of from 1.5% to 15%, and especially preferred, from 5% to 10%, where the mass fraction is the ratio $m_D/m_E$ of the mass $m_D$ of the component D to the mass $m_E$ of resin E in the composition. It has been found that a lower amount of D than 0.5% does not suffice to impart the needed flexibility for adequate coating film formation upon evaporation of the water, or diffusion thereof into a porous substrate, while a higher amount leads to insufficient hardness of the coating film.

The process of making the aqueously dispersible epoxy resin E preferably comprises reacting in the first step an aliphatic polyether polyol A and an epoxy resin B having at least two epoxide groups per molecule in the presence of an acidic catalyst wherein an adduct AB is formed.

The quantities of the aliphatic polyether polyol A and an epoxy resin B having at least two epoxide groups per molecule are chosen such that the ratio of the number of OH groups in the aliphatic polyol A to the number of epoxy groups of the epoxy compound B used in the condensation reaction is from being from 1:0.85 to 1:3.5, preferably from 1:0.9 to 1:2, and particularly preferred, from 1:0.95 to 1:1.5, and the specific amount of substance of epoxy groups of said condensation product being between 0.002 mol/kg and 5 mol/kg (corresponding to an "epoxy equivalent" between 200 g/mol and 500,000 g/mol), and particularly preferred, between 2.5 mmol/kg and 10 mmol/kg. It is also possible to use such conditions where the specific amount of substance of epoxy groups is even less than 0.002 mol/kg. The catalyst used is preferably of the Lewis acid type, such as boron trifluoride or antimony pentafluoride, or complexes thereof with ethers or amines.

This adduct AB is then reacted in the second step in an advancement reaction with a further epoxy resin B', the epoxy functional fatty acid ester D, and an aromatic polyol C. The advancement reaction is carried out in the absence of water, and is preferably catalysed with the commonly used catalyst systems, such as phosphines, particularly triphenylphosphine, phosphonium salts such as, for example, benzyltrimethyl-phosphonium chloride, tertiary amines such as, for example, benzyldimethylamine, quaternary ammonium salts such as, for example, tetramethylammonium chloride, alkali-metal hydroxides such as NaOH, LiOH, alkali-metal carbonates such as sodium carbonate, lithium carbonate, alkali-metal salts of organic acids such as sodium formate and lithium benzoate.

A preferred embodiment is to first react the adduct AB, further epoxy resin B' and aromatic polyol C in the presence of a catalyst until at least 90% of the epoxy groups present in the reaction mixture have been consumed, and then to add component D and optionally, further catalyst, and carry the reaction to completion. The reaction product is then dispersed in water to yield a fine particle dispersion having an average particle size of between 400 nm and 800 nm, at a mass fraction of solids of approximately 50%. It has been found that the quality of the film formed by this reaction variant is improved over the one-pot reaction where all reactants are added at the same stage.

A preferred embodiment of the reaction comprises adding an amount of D such that a portion of at least 5% thereof remains unreacted. The mixture obtained which comprises a portion of unrecated component D is also referred to as "resin E", for the sake of simplicity. If reference is made to the mass of resin E, this mass also comprises the mass of unreacted component D. If the resulting epoxy resin dispersion of E is combined with a curing agent which is based on a reaction product of an amine, and an epoxy resin, it has been found that the quality of films thus formed is even more improved, which shows by the absence of surface irregularities, and particularly, by the good corrosion resistance thus obtained.

The reaction product thus obtained, the aqueously dispersed epoxy resin E, can be used to formulate aqueous epoxy resin based coating compositions together with curing agents selected from the known basic or aminic curing agents such as polyfunctional amines, adducts of amines and epoxy resins, Mannich bases, and polyamidoamines. It is also possible to use acidic curing agents such as polycarboxylic acids and anhydrides thereof, as well as polyfunctional phenols, and aminoplasts and phenoplast resins.

The dispersions according to the invention are suitable in conjunction with suitable curing agents mainly for preparing coatings or intermediate coatings for the most diverse fields of application, in particular as protective coatings on metals, and also other rough and porous substrates. They are further suitable for chemical- and weathering-resistant coatings and linings of objects, particularly coatings and linings of metals, and especially, base metals.

Owing to their beneficial properties, the dispersions according to the invention are also outstandingly suitable for single-layer coatings. The adhesive coating layer may remain unaltered, but it may also serve as an intermediate layer, i.e. as a base for further coatings, which may in turn be composed of the same or a different common coating composition.

A further possibility is their use for water-dilutable adhesives. They may also be employed as binders for textiles, and organic or inorganic materials. In addition, they can also serve as an additive for synthetic cements.

When used as a coating agent, predominantly in aqueous coating compositions, the deposition on substrates such as metal, wood, glass, concrete, plastic, ceramic etc. is carried out by conventional methods such as brushing, spraying, dipping or rolling on. Insofar as no curing is also used for cold curing, the coatings are cured by heating to 100° C. to 250° C. for a time sufficient for curing, in general about five minutes to one hour. A preferred application is in coatings for flooring and as additive for hydraulic cements because of the low VOC which is possible with the systems of the present invention.

The invention is further explained in the following examples which are not to be construed as limiting.

Concentrations given in "%" (cg/g) are mass fractions, i. e., mass of solute divide by mass of solution.

EXAMPLE 1

Preparation of an Emulsifier AB

EXAMPLE 1.1

1500 g of a polyethylene glycol having a weight average molar mass $M_w$ of 3 kg/mol and 185 g of a polyglycidyl ether based on bisphenol A having a specific amount of substance of epoxy groups of 5.41 mol/kg (corresponding to an epoxy equivalent of 185 g/mol) were heated together to 100° C. 9 g of $BF_3$-diethyl etherate, diluted to 5% by weight with 1,4-dioxane, were added while stirring. The reaction mixture was the heated to 130° C. and kept at this temperature until the reaction had finished, which was indicated by the decrease of the specific amount of substance of epoxy groups to the specified value. The ratio of the number of OH groups to the number of epoxide groups was 1:1, and the specific amount of substance of epoxy groups of the reaction product was 2.8 mmol/kg (epoxy equivalent of approx. 360,000 g/mol).

EXAMPLE 1.2

In another run, 300 g of polyethylene glycol having a weight average molar mass $M_w$ of 4 kg/mol and 34.4 g of a polyglycidyl ether based on polyoxypropylene glycol having specific amount of substance of epoxy groups of 5.03 mol/kg (corresponding to an "epoxy equivalent" of 199 g/mol) were heated together to 100° C., and 0.7 g of $BF_3$-diethyl etherate, diluted with 10 ml of methyl isobutyl ketone, were added while stirring. The reaction mixture was the heated to 130° C. and kept at this temperature until the reaction had finished, which was indicated by the decrease of the specific amount of substance of epoxy groups to the specified value. The ratio of the number of OH groups to the number of epoxide groups was 1:1.15, and the specific amount of substance of epoxy groups was 6.7 mmol/kg (corresponding to an epoxy equivalent of approximately 150,000 g/mol).

EXAMPLE 2

Preparation of an Aqueously Dispersed Epoxy Resin 2400 g of the diglycidyl ether of bisphenol A, 400 g of an aqueous solution of the emulsifier of Example 1.1 (concentration of 50%), and 725 g of bisphenol A were mixed and heated to 85° C. Water was distilled off under reduced pressure, and then 1.6 g of triphenyl phosphine were added, and the mixture was heated to 150° C. under stirring. After one hour, 195 g of epoxidised soy bean oil were added together with another 1 g of triphenyl phosphine. The reaction was continued for two further hours, and then, 600 g of cold, fully deionised water were gradually added under vigorous stirring. The vessel temperature fell to 70° C., whereafter further three portions of 218 g of fully deionised water were added under stirring, at 60° C. The resulting whitish dispersion was then cooled to room temperature, and further 1400 g of fully deionised water were added.

A resin dispersion having a mass fraction of solids of 57% was obtained, with an average particle size of 690 nm, and a viscosity of 790 mPa·s at a shear rate of 100 s$^{-1}$, and 23° C.

EXAMPLE 3

Application Testing

Clear coating compositions were prepared according to the following recipe:

50 g each of the resin dispersion of example 2, and for comparison, a resin dispersion prepared in accordance with example IV-1 of EP 0 272 595 B1 which contained 3% of benzyl alcohol and 7% of methoxypropanol, were mixed with 25.3 g, and 19.4 g, respectively, of a commercial adduct curing agent of an epoxy resin and an aliphatic amine (®Beckopox VEH 2188/55WA, Cytec Austria GmbH). Viscosity was adapted by addition of fully deionised water to 830 mPa·s for both systems. Potlife was determined to be 3 h in each case.

These clear coating compositions (Paint 3.1 with the epoxy resin dispersion of example 2, and paint 3.2 with the comparative epoxy resin dispersion) were applied to glass plates and dried at 23° C. for seven days (approximately 70 μm dry film thickness). Both coating films were tested for hardness (pendulum hardness measured according to the procedure of König, DIN EN ISO 1522, in ambient condition which is 23° C. and 50% of relative humidity, and 23° C. and at 100% relative humidity for the saturated steam test).

Adhesion to the steel plates was on the same level for both, with a cross hatch test result of GT 0. Impact test in accordance with the Gardner method was conducted in accordance with ASTM D 2794-93 (1 in·lb=25.4 mm×4.448 N=113.0 mJ) and measured on coated steel panels with a dry film thickness of approximately 55 μm. The results are summarised in table 1:

TABLE 1

Application results

| Result for | unit | Paint of example 3.1 | Paint of example 3.2 |
|---|---|---|---|
| Hardness after 24 h | s | 67 | 36 |
| Hardness after 48 h | s | 81 | 46 |
| Hardness after 7 d | s | 111 | 87 |
| Hardness in saturated steam phase | s | 99 | 56 |
| Gardner Impact | in · lb (J) | 10 (1.13) | 20 (2.26) |
| Corrosion Test (EN ISO 9227) after 840 h | blistering | 1 (S3) | 2 (S3) |
| creep from scratch after 840 h | mm | 8 | 16 |

It can easily be seen from the examples that the absence of benzyl alcohol and the presence of component D both provides faster development of hardness in the coating film, and better humidity resistance. The Gardner impact which is a measure for the elasticity of the film is also improved vis-à-vis the standard system which has benzyl alcohol as coalescent agent.

As was expected, the VOC level is markedly reduced by the absence of benzyl alcohol, from a level of 188 g/L (resin dispersion for coating composition 3.2) to 4 g/L (resin dispersion for coating composition 3.1 according to the invention). The corrosion test was conducted in conformance with EN ISO 9227 (NSS Test), each sample having been tested with central scratch. Creep distance from the central scratch was markedly reduced which shows the excellent corrosion resistance achieved with a coating made from the resin composition of the present invention.

The invention claimed is:

1. A process of making an aqueously dispersible epoxy resin E comprising building blocks derived from an aliphatic polyether polyol A, an epoxy resin B having at least two epoxide groups per molecule, an epoxy resin B' having at least two epoxide groups per molecule, which may be identical to B, or different from B, an epoxy-functional fatty acid ester D, and an aromatic polyol C, which process comprises
   reacting in a first step an aliphatic polyether polyol A and an epoxy resin B having at least two epoxide groups per molecule, wherein an adduct AB is formed,
   the adduct AB, a further epoxy resin B' and an aromatic polyol C are first reacted in a second step in the presence of a catalyst until at least 90% of the epoxy groups present in the reaction mixture have been consumed, and then adding the epoxy functional fatty acid ester D, and optionally further catalyst, and carrying the reaction to completion.

2. The process of claim 1 wherein the amount of D is chosen such that a portion of at least 5% thereof remains unreacted.

3. The process of claim 1 wherein in the first step, the quantities of the aliphatic polyether polyol A and an epoxy resin B having at least two epoxide groups per molecule are chosen such that the ratio of the number of OH groups in the aliphatic polyol A to the number of epoxy groups of the epoxy compound B is from 1:0.85 to 1:3.5, and the specific amount of substance of epoxy groups of the adduct AB being between 0.002 mol/kg and 5 mol/kg.

4. An aqueously dispersible epoxy resin E, comprising building blocks derived from an aliphatic polyether polyol A, an epoxy resin B having at least two epoxide groups per molecule, an epoxy resin B' having at least two epoxide groups per molecule, which may be identical to B, or different from B, an epoxy-functional fatty acid ester D, and an aromatic polyol C, wherein said resin E is obtained by a process comprising
   reacting in a first step an aliphatic polyether polyol A and an epoxy resin B having at least two epoxide groups per molecule, wherein an adduct AB is formed,
   the adduct AB, a further epoxy resin B' and an aromatic polyol C are first reacted in a second step in the presence of a catalyst until at least 90% of the epoxy groups present in the reaction mixture have been consumed, and then adding the epoxy functional fatty acid ester D, and optionally further catalyst, and carrying the reaction to completion.

* * * * *